US012748753B1

(12) United States Patent
Hearn

(10) Patent No.: US 12,748,753 B1
(45) Date of Patent: Sep. 29, 2026

(54) STANDARDIZED DATA STRUCTURE TO INTEGRATE POSTPONED TRANSFER OPERATIONS IN SECURITY ASSESSMENT DATA

(71) Applicant: EQUIFAX INC., Atlanta, GA (US)

(72) Inventor: Carmen D. Hearn, San Juan Capistrano, CA (US)

(73) Assignee: EQUIFAX INC., Atlanta, GA (US)

( * ) Notice: Subject to any disclaimer, the term of this patent is extended or adjusted under 35 U.S.C. 154(b) by 0 days.

(21) Appl. No.: 19/552,465

(22) Filed: Feb. 27, 2026

(51) Int. Cl.
*G06F 16/21* (2019.01)
*G06F 16/2452* (2019.01)
*G06F 16/2453* (2019.01)

(52) U.S. Cl.
CPC ...... *G06F 16/24528* (2019.01); *G06F 16/211* (2019.01); *G06F 16/24535* (2019.01)

(58) Field of Classification Search
CPC ............. G06F 16/24528; G06F 16/211; G06F 16/24535
See application file for complete search history.

(56) References Cited

U.S. PATENT DOCUMENTS

| | | | | |
|---|---|---|---|---|
| 6,064,987 A * | 5/2000 | Walker | G06Q 40/02 | 705/40 |
| 6,070,147 A * | 5/2000 | Harms | G06Q 30/0226 | 705/14.27 |
| 6,944,597 B2 * | 9/2005 | Callen | G06Q 30/0283 | 705/4 |
| 9,378,770 B2 * | 6/2016 | Bowers | G11B 27/28 | |
| 9,690,820 B1 * | 6/2017 | Girulat, Jr. | G06F 16/2358 | |
| 10,402,806 B2 * | 9/2019 | George | G06Q 20/202 | |
| 10,529,016 B2 * | 1/2020 | Abela | G06Q 20/24 | |
| 11,436,500 B2 * | 9/2022 | Gupta | G06N 20/00 | |
| 11,537,845 B2 * | 12/2022 | Sevrens | G06N 3/0442 | |
| 11,810,166 B2 * | 11/2023 | Friedholm | G06Q 30/04 | |
| 12,417,214 B1 * | 9/2025 | Zhang | G06F 40/205 | |
| 2008/0004890 A1 * | 1/2008 | Hargroder | G06Q 20/10 | 705/320 |
| 2010/0094666 A1 * | 4/2010 | Pendergrass | G06Q 40/12 | 715/764 |
| 2015/0052041 A1 * | 2/2015 | Boyanov | G06Q 40/03 | 705/38 |

(Continued)

*Primary Examiner* — Jorge A Casanova
(74) *Attorney, Agent, or Firm* — Kilpatrick Townsend & Stockton LLP

(57) ABSTRACT

In some aspects, a computing system can generate a standardized data structure to integrate postponed transfer operations in security assessment data. The computing system can receive transfer operation data associated with one or more postponed transfer operations. The computing system can perform a conversion process to convert the transfer operation data into a standardized format. The conversion process can include segmenting each postponed transfer operation into a respective set of sub-operations. Each sub-operation can be allocated a corresponding amount of protected resources and can be scheduled at a respective time point. The conversion process additionally can include determining, based on the transfer operation data, a respective status of each sub-operation. The conversion process further can include encoding the respective status in association with each sub-operation. The computing system can generate a data structure including the transfer operation data in the standardized format.

20 Claims, 7 Drawing Sheets

(56) References Cited

U.S. PATENT DOCUMENTS

| | | | | |
|---|---|---|---|---|
| 2015/0081745 | A1* | 3/2015 | Kozin | G06F 16/2393 707/803 |
| 2015/0088559 | A1* | 3/2015 | Hinson | G06Q 40/06 705/4 |
| 2016/0086261 | A1* | 3/2016 | Shah | G06Q 10/105 705/38 |
| 2016/0103897 | A1* | 4/2016 | Nysewander | G06F 16/254 707/602 |
| 2016/0371661 | A1* | 12/2016 | Shah | G06Q 20/3674 |
| 2019/0129991 | A1* | 5/2019 | Auer | G06F 16/2365 |
| 2022/0353329 | A1* | 11/2022 | Chan | H04L 67/1095 |
| 2022/0366420 | A1* | 11/2022 | Kumari | G06Q 20/4016 |
| 2023/0351496 | A1* | 11/2023 | Ruble | G06Q 10/1057 |

* cited by examiner

400

| Scheduled Amount 402a | Amount Transferred 404a | Scheduled Date 406a | Execution Date 408a | Status 410a | Scheduled Amount 402b | Amount Transferred 404b | Scheduled Date 406b | Execution Date 408b | Status 410b |
|---|---|---|---|---|---|---|---|---|---|
| 9 | 9 | 8 | 8 | 2 | 9 | 9 | 8 | 8 | 2 |
| N | N | N | N | AN | N | N | N | N | AN |
| Integer | Integer | MMDDYYYY | MMDDYYYY | Rule Set | Integer | Integer | MMDDYYYY | MMDDYYYY | Rule Set |
| 000000115 | 000000115 | 04112025 | 04112025 | 11 | 000000115 | 000000115 | 04182025 | 04182025 | 11 |

FIG. 4

600

| | Operation ID 602 | Operation Type 604 | Initiating Entity ID 606 | Frequency 608 | # of Sub-Operations 610 | Initiation Date 612 | Total Amount 614 | Remaining Amount 616 |
|---|---|---|---|---|---|---|---|---|
| Field Length | 5 | 1 | 2 | 1 | 2 | 8 | 9 | 9 |
| Alpha/Numeric | AN | AN | AN | AN | N | N | N | N |
| Schema | Null | Rule Set | Rule Set | Rule Set | Rule Set | MMDDYYYY | Rule Set | Rule Set |
| Data Entry | ABC12 | P | FA | W | 04 | 04112025 | 000000457 | 000000342 |

FIG. 6

STANDARDIZED DATA STRUCTURE TO INTEGRATE POSTPONED TRANSFER OPERATIONS IN SECURITY ASSESSMENT DATA

TECHNICAL FIELD

The present disclosure relates generally to data integration. More specifically, but not by way of limitation, this disclosure relates to generating a standardized data structure to integrate postponed transfer operations in security assessment data.

BACKGROUND

A security assessment can be performed by various computing devices. In some examples, the security assessment can involve analyzing data to determine a likelihood of an adverse event, such as a data breach by a malicious actor. A computing device may be configured to analyze data and determine the likelihood of the adverse event based on a single source of data or using a single process. But, in some cases, the single source of data may not provide accurate security assessment input. For instance, the single source of data may be incomplete or may exclude certain types of data. Additionally, the computing device may not be configured to analyze more than the single source of data or execute more than a single process for performing the security assessment.

SUMMARY

Various aspects of the present disclosure provide systems and methods for generating a standardized data structure to integrate postponed transfer operations in security assessment data. In one example, a computer-implemented method is performed by one or more processing devices. The computer-implemented method includes receiving transfer operation data associated with a set of postponed transfer operations. Each postponed transfer operation of the set of postponed transfer operations can be initiated at a respective initial time point. The computer-implemented method additionally includes performing a conversion process to convert the transfer operation data into a standardized format. The conversion process can include one or more operations, such as segmenting each postponed transfer operation of the set of postponed transfer operations into a respective set of sub-operations. Each sub-operation of the respective set of sub-operations can be allocated a corresponding amount of protected resources. At least one sub-operation of the respective set of sub-operations can be scheduled at a time point subsequent to the respective initial time point. The conversion process additionally can include determining, based on the transfer operation data, a respective status of each sub-operation of the respective set of sub-operations. The conversion process further can include encoding the respective status in association with each sub-operation of the respective set of sub-operations. The computer-implemented method further includes generating a data structure comprising the transfer operation data in the standardized format. The data structure can present the respective set of sub-operations in an ordered arrangement based on a respective scheduled time point of each sub-operation of the respective set of sub-operations.

In another example, a system includes a processor and a memory device in which instructions executable by the processor are stored for causing the processor to perform various operations. The operations can include receiving transfer operation data associated with a set of postponed transfer operations. Each postponed transfer operation of the set of postponed transfer operations can be initiated at a respective initial time point. The operations additionally can include performing a conversion process to convert the transfer operation data into a standardized format. The conversion process can include segmenting each postponed transfer operation of the set of postponed transfer operations into a respective set of sub-operations. Each sub-operation of the respective set of sub-operations can be allocated a corresponding amount of protected resources. At least one sub-operation of the respective set of sub-operations can be scheduled at a time point subsequent to the respective initial time point. The conversion process additionally can include determining, based on the transfer operation data, a respective status of each sub-operation of the respective set of sub-operations. The conversion process further can include encoding the respective status in association with each sub-operation of the respective set of sub-operations. The operations further can include generating a data structure comprising the transfer operation data in the standardized format. The data structure can present the respective set of sub-operations in an ordered arrangement based on a respective scheduled time point of each sub-operation of the respective set of sub-operations.

In yet another example, a non-transitory computer-readable storage medium has program code that is executable by a processor to cause a computing device to perform various operations. The operations can include receiving transfer operation data associated with a set of postponed transfer operations. Each postponed transfer operation of the set of postponed transfer operations can be initiated at a respective initial time point. The operations additionally can include performing a conversion process to convert the transfer operation data into a standardized format. The conversion process can include segmenting each postponed transfer operation of the set of postponed transfer operations into a respective set of sub-operations. Each sub-operation of the respective set of sub-operations can be allocated a corresponding amount of protected resources. At least one sub-operation of the respective set of sub-operations can be scheduled at a time point subsequent to the respective initial time point. The conversion process additionally can include determining, based on the transfer operation data, a respective status of each sub-operation of the respective set of sub-operations. The conversion process further can include encoding the respective status in association with each sub-operation of the respective set of sub-operations. The operations further can include generating a data structure comprising the transfer operation data in the standardized format. The data structure can present the respective set of sub-operations in an ordered arrangement based on a respective scheduled time point of each sub-operation of the respective set of sub-operations.

This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

The foregoing, together with other features and examples, will become more apparent upon referring to the following specification, claims, and accompanying drawings.

BRIEF DESCRIPTION OF THE DRAWINGS

FIG. 4 is a data structure depicting an example of standardized transfer operation data that can be used to train an anomaly prediction model applicable in a security assessment application, according to certain aspects of the present disclosure.

FIG. 6 is a data structure depicting another example of standardized transfer operation data that can be used to train an anomaly prediction model applicable in a security assessment application, according to certain aspects of the present disclosure.

DETAILED DESCRIPTION

Figure 1:
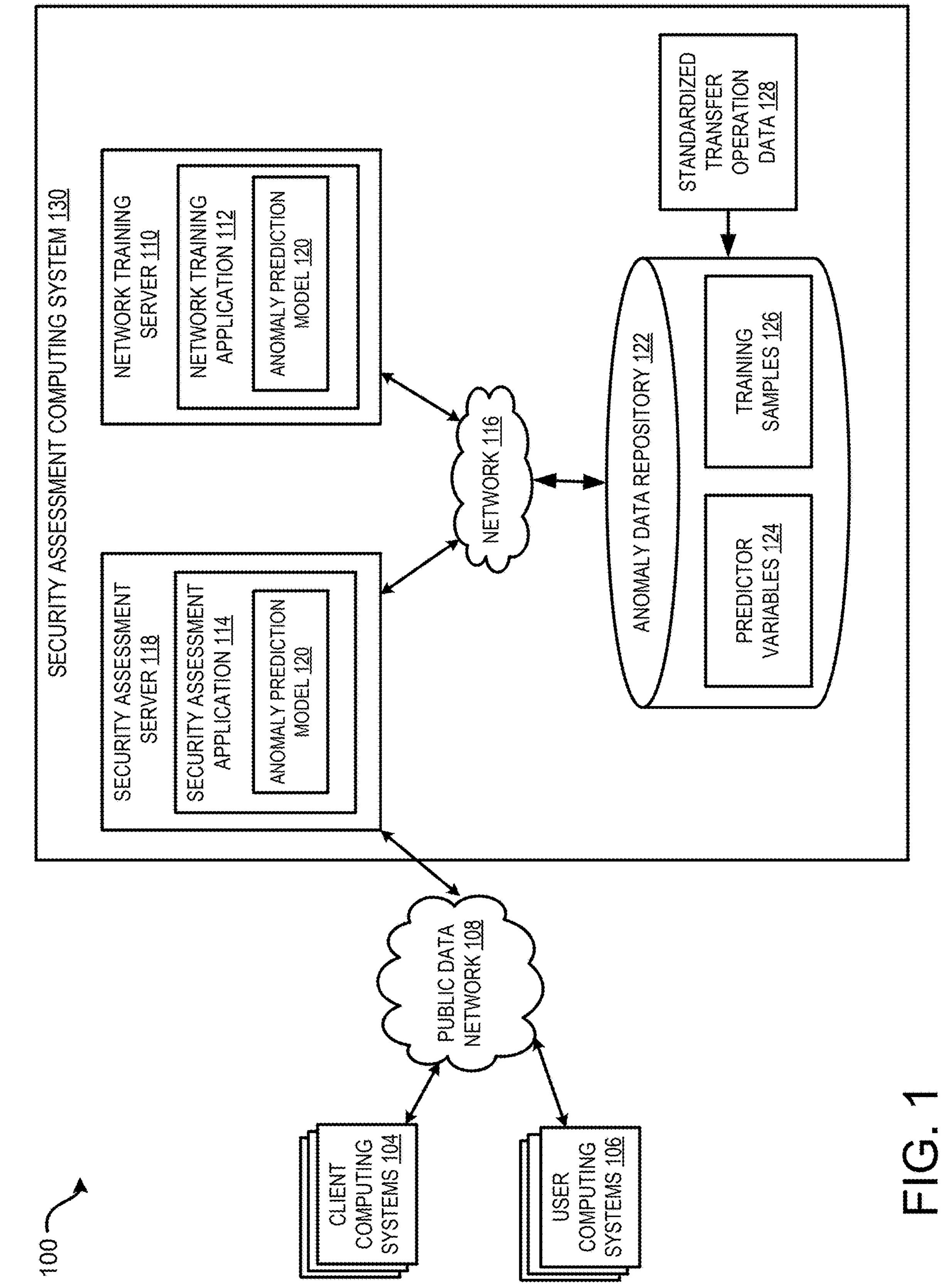
FIG. 1 is a block diagram depicting an example of a computing environment in which a predictive machine-learning model can be trained using standardized transfer operation data and applied in a security assessment application, according to certain aspects of the present disclosure.

Certain aspects and examples of the present disclosure relate to generating a standardized data structure to integrate postponed transfer operations in security assessment data. In an example, a computing system can receive a set of transfer operation data from distributed data sources. Non-limiting examples of the distributed data sources include an individual entity, a service provider, or other suitable data sources. The distributed sources can be heterogeneous data sources that may use different data formats or collect different types of information. The set of transfer operation data can include data associated with the postponed transfer operations and may include data associated with other types of transfer operations. The data associated with the postponed transfer operations can be considered high-velocity data that can be generated, distributed, or collected continuously or at frequent intervals. In some implementations, a postponed transfer operation can be a transfer operation with two or more short-term sub-operations. For example, a postponed transfer operation can include a series of sub-operations respectively scheduled to occur within two weeks after a preceding sub-operation of the postponed transfer operation. In some examples, the computing system can segment a postponed transfer operation into a set of sub-operations. Based on this segmentation, the computing system can convert the set of transfer operation data into a data structure having a structured format. The data structure can be used to train or otherwise build a predictive model. For example, the data structure can be included as part of training data used to train the predictive model to learn certain relationships between inputs and outputs in the training data. Once trained, the predictive model can generalize these relationships to make predictions or generate other suitable output using unseen data. For example, the predictive model can be trained to output an anomaly indicator corresponding to a target entity. The anomaly indicator can quantify or otherwise indicate a likelihood of an adverse event occurring in association with the target entity.

In some examples, each sub-operation of the set of sub-operations can be scheduled to occur at a respective time point. For example, execution of the set of sub-operations can span a time window starting at an initiation time point of the postponed transfer operation and ending at a completion time point of the postponed transfer operation. A first sub-operation of the set of sub-operations can be scheduled to execute at the initiation time point, while the last sub-operation of the set of sub-operations can be scheduled to execute at the completion time point. In some implementations, the computing system may segment the postponed transfer operation into two or more sub-operations, such as two sub-operations, three sub-operations, four sub-operations, five sub-operations, six sub-operations, eight sub-operations, ten sub-operations, etc.

In some implementations, existing data structures used to provide transfer operation data can forgo or otherwise lack information related to postponed transfer operations. For example, these existing data structures typically use a data reporting format built for reporting on a monthly basis. But postponed transfer operations often include sub-operations scheduled to occur on a weekly basis or a biweekly basis (e.g., once every two weeks). In some implementations, data associated with postponed transfer operations can be high-velocity data that can be generated at time intervals that are incompatible with the data reporting format of the existing data structures. For example, high-velocity data may be generated or received on a daily, weekly, or biweekly basis. By way of example, a postponed transfer operation can include a sequence of four sub-operations with subsequent sub-operations scheduled to occur a week after a prior sub-operation. Attempting to include information corresponding to the postponed transfer operations in these existing data structures can result in misrepresentation of the postponed transfer operations, such as a respective outcome of individual sub-operations.

In some examples, reporting the postponed transfer operations on a monthly basis using existing data reporting formats can remove details associated with the postponed transfer operations, which can violate regulatory standards associated with accurate data reporting. For example, certain regulatory standards include reporting requirements related to reporting data that is timely and accurate. Additionally, this can lead to inaccurate security assessment results due to inaccurate or insufficient information related to the postponed transfer operations. For example, the existing data structures may fail to include or accurately represent an adverse event associated with a particular sub-operation of a postponed transfer operation due to the postponed transfer operation being initiated and completed in less than 30 days. Due to these deficiencies in the existing data structures, certain entities or organizations may forgo reporting information corresponding to postponed transfer operations. By excluding information related to postponed transfer operations, the existing data structures can cause gaps in data integrity and accuracy, resulting in inaccurate anomaly predictions.

Additionally, the data reporting format used by the existing data structures can have a specific file layout that can make it difficult to modify to include information related to postponed transfer operations. For example, the specific file layout may define a maximum number of characters. As another example, the specific file layout may specify a respective length and position of each data entry in the file layout. These restrictions of the existing data structures can hinder modifications to accommodate postponed transfer operations. Reporting information corresponding to postponed transfer operations in a separate data structure can result in data silos or other incompatibility between the existing data structures and the separate data structure.

Certain aspects described herein provide improvements to data integration techniques, for example, to integrate postponed transfer operations in access control associated with entities. In some examples, a computing system can perform techniques described herein to convert information related to postponed transfer operations into a standardized format. For example, the techniques described herein can convert and consolidate transfer operation data from various providers or data sources into a data structure having the standardized format. A security assessment system can receive the data structure in a timely manner and can readily adapt or adjust its predictive model(s) in accordance with the transfer operation data obtained from the data structure.

In some implementations, the computing system can segment each postponed transfer operation into individual sub-operations. Based on this segmentation, the computing system can generate a data structure that can preserve granularity of the information corresponding to the postponed transfer operations. For example, the data structure can present individual outcomes of each sub-operation, such as indicating that an adverse event occurred in association with a sub-operation and whether the adverse event was resolved in a subsequent sub-operation. As another example, the data structure can include status indicators assigned to each sub-operation that can indicate a respective outcome of a corresponding sub-operation. The security assessment system can use the status indicators as part of its determination of an anomaly indicator corresponding to a target entity, which can improve an accuracy of predictions generated by the security assessment system.

In some implementations, the standardized data structure described herein can be compliant with regulations, business policies, or other criteria used in security assessments. Non-limiting examples of regulations and other legal requirements to which the standardized data structure conforms include reporting requirements associated with the Equal Credit Opportunity Act ("ECOA"), the Fair Credit Reporting Act ("FCRA"), the Dodd-Frank Act, and the Office of the Comptroller of the Currency ("OCC"). As described herein, the data structure can facilitate compliance with the regulations, business policies, or other criteria by providing an accurate representation of postponed transfer operations, such as by including individual outcomes of each sub-operation. In some implementations, the data structure can facilitate compliance with the regulations, business policies, or other criteria by enabling timely reporting of data associated with postponed transfer operations or other types of transfer operations. For example, the data structure can be updated at more frequent intervals compared to existing data structures, such as to accommodate high-velocity data (e.g., data corresponding postponed transfer operations). Once updated, the data structure can be made available for use in security assessments, such as using a publish-subscribe communication protocol. For example, the data structure can be transmitted to a security assessment system at more frequent intervals compared to existing data structures, which can enable timely security assessments and corresponding remediation actions to be performed.

In some examples, integrating the status indicators or other portions of standardized transfer operation data described herein in model training can enable automatic detection of anomalies or adverse events. This can allow for automatic, proactive actions in response to anomalies or automatic, proactive remediation of adverse events, such as by controlling access to a protected resource (e.g., an online resource, a system resource, etc.). For example, based on the anomaly indicator outputted by the security assessment system being outside a predefined threshold, the security assessment system or another suitable computing system can automatically deny access to a protected resource, such as a computing environment. Certain actions may be performed automatically with little to no manual input. This can reduce manual effort associated with enforcing security protections, such as with respect to network security. Additionally, remedial actions may be performed in a more timely manner by avoiding a delay caused by manual decision-making.

Additionally, the standardized format of the data structure can accommodate other types of transfer operations, which can facilitate compatibility with existing data reporting formats. Instead of generating, transmitting, or storing separate data reports based on different types of transfer operations, the computing system can convert heterogeneous transfer operation data to the same standardized format. This can reduce resource consumption, such as reducing consumption of memory, processing power, or storage, while improving data integrity. For example, rather than using separate data parsers to process existing data structures and data corresponding to postponed transfer operations, the computing system can use a single data parser to process the data structure with the standardized format.

These illustrative examples are given to introduce the reader to the general subject matter discussed here and are not intended to limit the scope of the disclosed concepts. The following sections describe various additional features and examples with reference to the drawings in which like numerals indicate like elements, and directional descriptions are used to describe the illustrative examples but, like the illustrative examples, should not be used to limit the present disclosure.

Operating Environment Example for Security Assessment Operations

Referring now to the drawings, FIG. 1 is a block diagram depicting an example of an operating environment 100 in which a security assessment computing system 130 builds and trains an anomaly prediction model 120 that can be utilized to output anomaly indicators based on predictor variables. FIG. 1 depicts examples of hardware components of a security assessment computing system 130, according to some aspects. The security assessment computing system 130 is a specialized computing system that may be used for processing large amounts of data using a large number of computer processing cycles. The security assessment computing system 130 can include a model training server 110 for building and training the anomaly prediction model 120. In some implementations, input predictor variables 124 of the anomaly prediction model 120 or factors of the input predictor variables 124 can have a monotonic relationship with the output of the anomaly prediction model 120. The security assessment computing system 130 can further include a security assessment server 118 for performing a security assessment for given predictor variables 124 using the trained anomaly prediction model 120. In some examples, performing the security assessment can include determining a likelihood of an adverse event or an anomaly occurring. For example, the trained anomaly prediction model 120 can be trained to detect anomalies by learning patterns from training data to identify or detect potential anomalies. As a non-limiting example, an anomaly can indicate a potential network intrusion, a potential malicious attack, a potential loss of system resources, etc.

The model training server 110 can include one or more processing devices that execute program code, such as a model training application 112. The program code is stored on a non-transitory computer-readable medium. The model training application 112 can execute one or more processes to train and optimize the anomaly prediction model 120 for predicting anomaly indicators based on predictor variables 124. In some implementations, the model training application can train and optimize the anomaly prediction model 120 to maintain a monotonic relationship between the factors of the predictor variables 124 and the predicted anomaly indicators.

In some aspects, the model training application 112 can build and train the anomaly prediction model 120 utilizing model training samples 126 in a training process. The model training samples 126 can include multiple training vectors including training predictor variables and training anomaly indicator outputs corresponding to the training vectors. In the example of FIG. 1, the model training samples 126 can be generated using standardized transfer operation data 128. In some examples, the security assessment computing system 130 may receive the standardized transfer operation data 128 from a data integration system. For example, the security assessment computing system 130 may receive a data structure, such as a file, a table, etc., from the data integration system. In some implementations, the data integration system may be part of the security assessment computing system 130. In other implementations, the data integration system may be separate from the security assessment computing system 130, such as part of an external service provider or a client computing system 104. The model training samples 126 can be stored in one or more network-attached storage units on which various repositories, databases, or other structures are stored. A non-limiting example of these data structures include an anomaly data repository 122.

Network-attached storage units may store a variety of different types of data organized in a variety of different ways and from a variety of different sources. For example, the network-attached storage unit may include storage other than primary storage located within the model training server 110 that is directly accessible by processors located therein. In some aspects, the network-attached storage unit may include secondary, tertiary, or auxiliary storage, such as large hard drives, servers, virtual memory, among other types. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include, for example, a magnetic disk or tape, optical storage media such as a compact disk or digital versatile disk, flash memory, memory, or memory devices.

The security assessment server 118 can include one or more processing devices that execute program code, such as a security assessment application 114. The program code is stored on a non-transitory computer-readable medium. The security assessment application 114 can execute one or more processes to utilize the anomaly prediction model 120 trained by the model training application 112 to predict anomaly indicators based on input predictor variables 124. In some implementations, the model training application 112 can maintain a monotonic relationship between the predictor variables 124 and the predicted anomaly indicators. A monotonic relationship between the predictor variables 124 and the predicted anomaly indicator can facilitate explainability (e.g., an amount of impact that the predictor variables 124 have on the anomaly indicator value). As described herein, monotonicity can be enforced during model development (e.g., training). In general, monotonicity can ensure that a probability of an anomaly or an adverse event occurring increases with an increase in time length. Additionally, the anomaly prediction model 120 can be used to generate explanation codes (e.g., reason codes) corresponding to the predictor variables 124. The explanation codes can indicate an effect or an amount of impact that one or more predictor variables have on the anomaly indicator.

Furthermore, the security assessment computing system 130 can communicate with various other computing systems, such as client computing systems 104. For example, client computing systems 104 may send security assessment queries to the security assessment server 118 for security assessment. As another example, the client computing system 104 may send signals to the security assessment server 118 that control or otherwise influence different aspects of the security assessment computing system 130. The client computing systems 104 may also interact with user computing systems 106 via one or more public data networks 108 to facilitate interactions between users of the user computing systems 106 and interactive computing environments provided by the client computing systems 104.

Each client computing system 104 may include one or more third-party devices, such as individual servers or groups of servers operating in a distributed manner. A client computing system 104 can include any computing device or group of computing devices operated by a seller, lender, or other providers of products or services. The client computing system 104 can include one or more server devices. The one or more server devices can include or can otherwise access one or more non-transitory computer-readable media. The client computing system 104 can also execute instructions that provide an interactive computing environment accessible to user computing systems 106. Examples of the interactive computing environment include a mobile application specific to a particular client computing system 104, a web-based application accessible via a mobile device, etc. The executable instructions are stored in one or more non-transitory computer-readable media.

The client computing system 104 can further include one or more processing devices that are capable of providing the interactive computing environment to perform operations described herein. The interactive computing environment can include executable instructions stored in one or more non-transitory computer-readable media. The instructions providing the interactive computing environment can configure one or more processing devices to perform operations described herein. In some aspects, the executable instructions for the interactive computing environment can include instructions that provide one or more graphical interfaces. The graphical interfaces are used by a user computing system 106 to access various functions of the interactive computing environment. For instance, the interactive computing environment may transmit data to and receive data from a user computing system 106 to shift between different states of the interactive computing environment, where the different states allow one or more electronics transactions between the user computing system 106 and the client computing system 104 to be performed.

In some examples, a client computing system 104 may have other computing resources associated therewith (not shown in FIG. 1), such as server computers hosting and managing virtual machine instances for providing cloud computing services, server computers hosting and managing online storage resources for users, server computers for providing database services, and others. The interaction between the user computing system 106 and the client computing system 104 may be performed through graphical user interfaces presented by the client computing system 104 to the user computing system 106, or through application programming interface (API) calls or web service calls.

A user computing system 106 can include any computing device or other communication device operated by an entity, such as a user, an organization, or a company. The user computing system 106 can include one or more computing devices, such as laptops, smartphones, and other personal computing devices. A user computing system 106 can include executable instructions stored in one or more non-transitory computer-readable media. The user computing system 106 can also include one or more processing devices that are capable of executing program code to perform operations described herein. In various examples, the user computing system 106 can allow a user to access certain online services from a client computing system 104 or other computing resources, to engage in mobile commerce with a client computing system 104, to obtain controlled access to electronic content hosted by the client computing system 104, etc.

For instance, the user can use the user computing system 106 to engage in an electronic transfer operation with a client computing system 104 via an interactive computing environment. An electronic transfer operation between the user computing system 106 and the client computing system 104 can include, for example, the user computing system 106 being used to request online storage resources managed by the client computing system 104, acquire cloud computing resources (e.g., virtual machine instances), and so on. An electronic transfer operation between the user computing system 106 and the client computing system 104 can also include, for example, querying a set of sensitive or other controlled data, accessing online financial services provided via the interactive computing environment, submitting an online credit card application or other digital application to the client computing system 104 via the interactive computing environment, and/or operating an electronic tool within an interactive computing environment hosted by the client computing system (e.g., a content-modification feature, an application-processing feature, etc.).

In some aspects, an interactive computing environment implemented through a client computing system 104 can be used to provide access to various online functions. As a simplified example, a website or other interactive computing environment provided by an online resource provider can include electronic functions for requesting computing resources, online storage resources, network resources, database resources, or other types of resources. In another example, a website or other interactive computing environment provided by a financial institution can include electronic functions for obtaining one or more financial services, such as loan application and management tools, credit card application and transaction management workflows, electronic fund transfers, etc. A user computing system 106 can be used to request access to the interactive computing environment provided by the client computing system 104, which can selectively grant or deny access to various electronic functions. Based on the request, the client computing system 104 can collect data associated with the user and communicate with the security assessment server 118 for security assessment. Based on the anomaly indicator predicted by the security assessment server 118, the client computing system 104 can determine whether to grant the access request of the user computing system 106 to certain features of the interactive computing environment.

In a simplified example, the system depicted in FIG. 1 can configure an anomaly prediction model 120 to be used both for accurately determining anomaly indicators, such as credit scores, using predictor variables 124 and for determining adverse action codes or other explanation codes for the predictor variables 124. A predictor variable 124 can be any variable predictive of a likelihood of an anomaly or an adverse event that is associated with an entity. Any suitable predictor variable that is authorized for use by an appropriate legal or regulatory framework may be used.

Examples of predictor variables 124 used for predicting the likelihood of an anomaly or an adverse event associated with an entity accessing online resources include, but are not limited to, variables indicating the demographic characteristics of the entity (e.g., name of the entity, the network or physical address of the company, the identification of the company, the revenue of the company), variables indicative of prior actions or transactions involving the entity (e.g., past requests of online resources submitted by the entity, the amount of online resource currently held by the entity, and so on.), variables indicative of one or more behavioral traits of an entity (e.g., the timeliness of the entity releasing the online resources), etc. As a non-limiting example, at least a portion of the predictor variables 124 can include variables determined based on the standardized transfer operation data 128. As described herein, the standardized transfer operation data 128 can include a respective status indicator assigned to each sub-operation that can indicate a corresponding outcome of each sub-operation. In some examples, these status indicators can be indicative of the timeliness of the entity releasing online or system resources.

Similarly, examples of predictor variables 124 used for predicting the likelihood of an anomaly or an adverse event associated with an entity accessing services provided by a financial institute include, but are not limited to, variables indicative of one or more demographic characteristics of an entity (e.g., age, gender, income, etc.), variables indicative of prior actions or transactions involving the entity (e.g., information that can be obtained from credit files or records, financial records, consumer records, or other data about the activities or characteristics of the entity), variables indicative of one or more behavioral traits of an entity, etc. As a non-limiting example, at least a portion of the predictor variables 124 can include variables determined based on debt financing activity, which can include installment plan financing activity or short-term debut financing activity, such as buy now, pay later financing.

The predicted anomaly indicator can be utilized by the service provider to determine the likelihood of an anomaly or an adverse event associated with the entity accessing a service provided by the service provider, thereby granting or denying access by the entity to an interactive computing environment implementing the service. For example, if the service provider determines that the predicted anomaly indicator is lower than a threshold anomaly indicator value, then the client computing system 104 associated with the service provider can generate or otherwise provide access permission to the user computing system 106 that requested the access. The access permission can include, for example, cryptographic keys used to generate valid access credentials or decryption keys used to decrypt access credentials. The client computing system 104 associated with the service provider can also allocate resources to the user and provide a dedicated web address for the allocated resources to the user computing system 106, for example, by adding it in the access permission. With the obtained access credentials and/or the dedicated web address, the user computing system 106 can establish a secure network connection to the computing environment hosted by the client computing system 104 and access the resources via invoking API calls, web service calls, HTTP requests, or other proper mechanisms.

Each communication within the operating environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices depicted in FIG. 1 is provided for illustrative purposes. Different numbers of devices may be used. For example, while certain devices or systems are shown as single devices in FIG. 1, multiple devices may instead be used to implement these devices or systems. Similarly, devices or systems that are shown as separate, such as the model training server 110 and the security assessment server 118, may be instead implemented in a single device or system.

Examples of Operations Involving Data Integration

Figure 2:
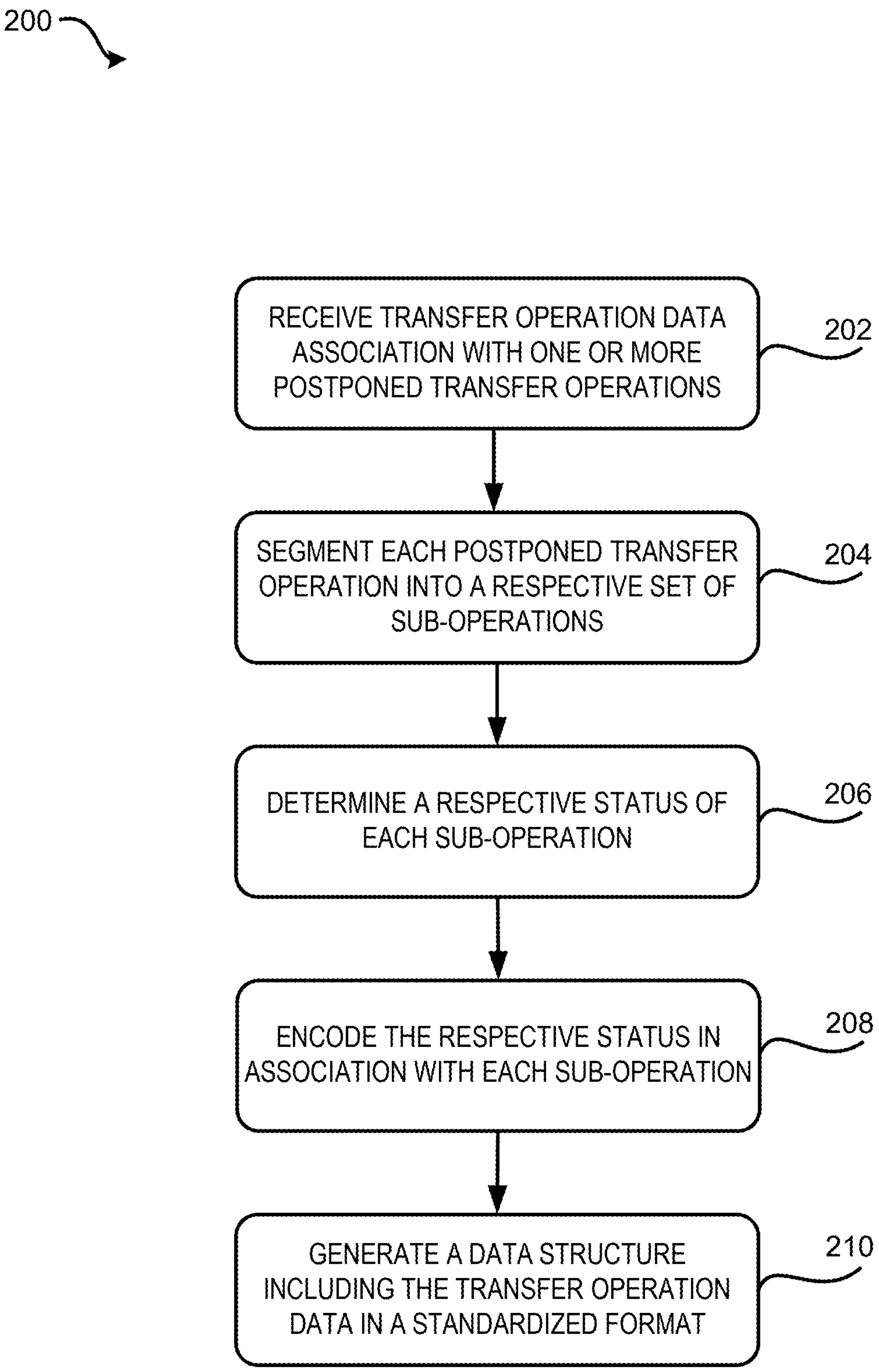
FIG. 2 is a flow chart depicting an example of a process for generating a standardized data structure to integrate postponed transfer operations in security assessment data, according to certain aspects of the present disclosure.

FIG. 2 is a flow chart depicting an example of a process 200 for generating a standardized data structure to integrate postponed transfer operations in security assessment data, according to certain aspects of the present disclosure. A computing system (e.g., the data integration system 304 of FIG. 3) including one or more computing devices (e.g., a server, a laptop computer, a desktop computer, a mobile device, etc.) can implement operations depicted in FIG. 2 by executing suitable program code. For illustrative purposes, the process 200 is described with reference to certain examples or components depicted in the figures. Other implementations, however, are possible.

At block 202, the process 200 involves receiving transfer operation data associated with one or more postponed transfer operations. Each postponed transfer operation can be initiated at a respective initial time point. In some examples, the initial time point can be referred to as an initiation time point or an initiation date. As described herein, each postponed transfer operation can be split or segmented into a set of sub-operations that can each be scheduled to be executed at a respective time point. In some implementations, the initial time point of a postponed transfer operation can correspond to or be the same as a scheduled time point of a first sub-operation of the postponed transfer operation.

In some examples, the computing system can receive the transfer operation data from heterogeneous data sources or distributed data sources. For example, the data sources providing the transfer operation data may be located in different geographic regions (e.g., different cities, states, provinces, countries, continents, etc.). As another example, each data source may collect, store, or provide a respective portion of the transfer operation data using a respective data format that can differ from other data sources. In some examples, the computing system can be in communication with the data sources, such as wireless communication via a network. As an example, the computing system may receive the transfer operation data in batches, such as on a daily basis, a weekly basis, a monthly basis, etc. As another example, the computing system may receive certain transfer operation data substantially contemporaneously (e.g., in real-time). In some implementations, the computing system may receive certain transfer operation data once a corresponding transfer operation is initiated at an initiating entity. For example, the initiating entity can be a data source from which the computing system can receive at least a portion of the transfer operation data. In some examples, the computing system can be part of or associated with the initiating entity, such as to perform data integration on the transfer operation data such that the transfer operation data can be transmitted or used for security assessment applications.

As described herein, at least a portion of the transfer operation data received by the computing system can correspond to postponed transfer operations. In some implementations, a postponed transfer operation can be a transfer operation with two or more short-term sub-operations. For example, a postponed transfer operation can include a sequence of sub-operations respectively scheduled to occur a week or two weeks after a preceding sub-operation of the postponed transfer operation. By way of example, the postponed transfer operation can have an active time window of up to 42 days, such as ranging from 1 day to 7 days, 1 day to 15 days, 1 day to 30 days, 1 day to 42 days, and the like. The active time window can correspond to a period of time in which activities associated with the postponed transfer operation occur, such as execution of sub-operations of the postponed transfer operation, updates to a respective status of the sub-operations, etc. In some examples, the postponed transfer operation may be considered to be completed or resolved once a terminating sub-operation of the sequence of sub-operations has executed. For example, the terminating sub-operation can correspond to a last sub-operation in the sequence of sub-operations. As another example, the terminating sub-operation can be executed in response to an adverse event associated with the postponed transfer operation or an entity corresponding to the postponed transfer operation.

The process 200 additionally involves performing a conversion process to convert the transfer operation data into a data structure having a standardized format (e.g., the standardized transfer operation data 128 of FIG. 1). The standardized format can be a structured data format defined by a schema. The schema can include or otherwise define a respective data type and a respective set of rules corresponding to each data entry of the data structure. In some implementations, the conversion process can include one or more operations described below with respect to block 204, block 206, and block 208.

At block 204, the process 200 involves segmenting each postponed transfer operation into a respective set of sub-operations. In some implementations, certain postponed transfer operations can be segmented into a respective set of two or more sub-operations, such as a set of four sub-operations or a set of six sub-operations. Each sub-operation of a postponed transfer operation can be scheduled to be executed based on a specific time interval, such as a weekly basis or a biweekly basis. By way of example, each sub-operation of the postponed transfer operation can be assigned a respective date by which to be executed. As described herein, each sub-operation of the postponed transfer operation can be scheduled at a respective subsequent time point after an initial time point of the postponed transfer operation.

In some examples, the computing system can determine a target number of segments corresponding to a postponed transfer operation, such as based on the transfer operation data received from the data sources or based on user input. For example, the computing system may parse the transfer operation data to identify a numeric value in the transfer operation data that corresponds to the target number of segments. The target number of segments may be inputted when initiating the postponed transfer operation. The target number of segments can vary for different postponed transfer operations. Once the computing system determines the target number of segments, the computing system can divide the postponed transfer operation into a set of sub-operations consistent with the target number of segments.

In some examples, the computing system can determine a target time interval corresponding to the postponed transfer operation. The target time interval can indicate a target time window between a preceding sub-operation and a subsequent sub-operation of the postponed transfer operation. The target time interval can vary for different postponed transfer operations. The computing system can schedule each sub-operation of the postponed transfer operation based on the target time interval. For example, the computing system can determine that the postponed transfer operation was initiated on Feb. 20, 2026, and is assigned a target time interval of 7 days. The computing system can schedule a first sub-operation of the postponed transfer operation to occur on Feb. 20, 2026, based on an initiation time point of the postponed transfer operation. Additionally, the computing system can schedule one or more subsequent sub-operations to occur at a respective 7-day interval from a preceding sub-operation. For example, a second sub-operation of the postponed transfer operation can be scheduled to execute on Feb. 27, 2026. In some implementations, a time window between a scheduled execution of each sub-operation of the postponed transfer operation can be less than thirty days, such as ranging from 1 day to 7 days, from 7 days to 14 days, etc.

In some implementations, each postponed transfer operation can be assigned or be associated with transferring or reallocating a corresponding amount of protected resources (e.g., online resources or system resources). For example, transferring the corresponding amount of protected resources can resolve or complete each postponed transfer operation. Non-limiting examples of the protected resources include memory, storage, processing power (e.g., threads, cores, etc.), network resources, money, containers, and virtual machines. In some examples, each sub-operation of the postponed transfer operation can be allocated a respective portion of the protected resources associated with the postponed transfer operation. By way of example, a postponed transfer operation may be initiated to reallocate a portion of memory to a new software program. Each sub-operation of the postponed transfer operation can be assigned a respective set of memory addresses that can, in total, correspond to the portion of memory corresponding to the postponed transfer operation. Execution of each sub-operation can cause a respective reallocation of a corresponding set of memory addresses. In certain applications, a postponed transfer operation can be a short-term debt financing transaction that can involve initially paying a portion of a purchase and postponing payment of a remaining portion of the purchase to one or more future time points.

At block 206, the process 200 involves determining, based on the transfer operation data, a respective status of each sub-operation of the respective set of sub-operations. For example, a status of a sub-operation can indicate that a timely execution of the sub-operation has occurred. As another example, the status of the sub-operation may indicate that execution of the sub-operation was delayed, such as by a day, a week, etc. As yet another example, the status of the sub-operation may indicate that a corresponding postponed transfer operation was initiated by a fraudulent entity. In some examples, the computing system can determine a status of a particular sub-operation based on an outcome of the particular sub-operation. For example, based on the outcome of the particular sub-operation, the computing system may determine that a specific adverse event has occurred. As a non-limiting example, an adverse event can include activity by a malicious actor, such as fraud, a code injection, phishing, malware, etc. As another example, based on the outcome of the particular sub-operation, the computing system can determine that the particular sub-operation was executed on schedule. As yet another example, the outcome of the particular sub-operation can indicate that a postponed transfer operation corresponding to the particular sub-operation has terminated or been resolved in response to a timely execution of the particular sub-operation.

In some examples, the outcome of the particular sub-operation may indicate that a delay in executing the particular sub-operation has occurred, such as due to an occurrence of an adverse event or an anomalous event (e.g., a power outage, an unscheduled service outage, etc.). The computing system may determine that the particular sub-operation has a delayed status based on the delay in executing the particular sub-operation. In some examples, the computing system can determine an amount of time that execution of the particular sub-operation was delayed, such as a time window past a scheduled time point of the particular sub-operation. For example, the computing device can determine the time window using the transfer operation data based on a comparison of an execution time point of the particular sub-operation to a scheduled time point of the particular sub-operation. In some implementations, a greater delay in executing a sub-operation can indicate a higher likelihood of an anomaly or an adverse event occurring.

At block 208, the process 200 involves encoding the respective status in association with each sub-operation of the respective set of sub-operations. In some examples, the computing system can encode a status of a sub-operation using a status indicator representative of the status. As a non-limiting example, the status indicator can be a character or a sequence of characters that may have a predefined length, such as two characters. The status indicator may include numbers, letters, symbols, whitespaces, or other suitable characters. In some implementations, a respective status indicator can be assigned to each possible status of a sub-operation. For example, a status indicator of '01' may indicate that an execution of a sub-operation has been delayed by a time window ranging from 1 day to 5 days. As another example, a status indicator of '02' may indicate that an execution of a sub-operation has been delayed by a time window ranging from 6 days to 10 days. As yet another example, a status indicator of '03' may indicate that an execution of a sub-operation has been delayed by a time window ranging from 11 days to 15 days.

The computing system can select the status indicator based on an outcome of the particular sub-operation. For example, the computing device can select the status indicator based on an amount of delay in executing a particular sub-operation, such as a time window past a scheduled time point of the particular sub-operation. In some implementations, the computing system can select the status indicator from a set of predefined status indicators. By way of example, the set of predefined status indicators can include a respective status indicator corresponding to specific time windows that can quantify the amount of delay in executing the particular sub-operation. For example, as described herein a status indicator in the set of predefined status indicators can indicate a delay ranging from 1 day to 5 days, 6 days to 10 days, 11 days to 15 days, 16 days to 20 days, 21 days to 25 days, or 26 days to 29 days, etc. Once the computing system selects the status indicator corresponding to the particular sub-operation, the computing system can encode the status indicator, such as by storing the status indicator in association with the particular sub-operation.

In some implementations, the computing system may implement one or more operations described herein using a rule-based approach, such as to select a status indicator of a particular sub-operation. For example, the computing system can execute a rule engine that can apply one or more rule sets to perform one or more operations described herein. In some implementations, the rule engine may selectively apply at least a portion of the rule sets to automatically determine the status indicator to assign to the particular sub-operation. For example, the rule sets can define one or more conditions that the rule engine can use to evaluate an outcome or a status of the particular sub-operation to determine a suitable status indicator. In some examples, the rule engine may select which rule sets to apply based on the target number of segments or the target time interval corresponding to a postponed transfer operation.

At block 210, the process 200 involves generating a data structure including the transfer operation data in the standardized format. Non-limiting examples of the data structure include a file, a database, a database system, a table, etc. In some implementations, the data structure can facilitate organization and access to the transfer operation data. For example, using data integration to generate the data structure can consolidate the transfer operation data from disparate sources to prevent data silos or inconsistencies in the transfer operation data. In some implementations, the data structure can present a set of sub-operations of a postponed transfer operation in an ordered arrangement, such as based on a respective scheduled time point of each sub-operation of the set of sub-operations. By way of example, the data structure can present information corresponding to the set of sub-operations in sequential columns, such as starting with a first sub-operation in the set of sub-operations and ending with a terminating sub-operation in the set of sub-operations.

In some examples, as described herein, the standardized format can be a structured data format defined by a schema. In general, the schema can define a structure, data organization, data constraints, or a combination thereof with respect to the data structure. Generating the data structure can involve encoding the transfer operation data in the data structure in compliance with the schema. As an example, the schema can provide metadata in association with certain portions of the data structure. The metadata may provide context or instructions with respect to inputting suitable data in the data structure. As another example, the schema can specify a data type or a set of rules that can govern an organization or presentation of the transfer operation data in the data structure.

In some examples, the rule engine of the computing system can apply one or more rule sets consistent with rules defined by the schema. For example, the rule engine may apply a rule defined in the schema to round up a numeric value to a whole number prior to storing the numeric value in the data structure. As another example, the rule engine may apply a rule defined in the schema to store a negative numeric value of the transfer operation data as zero in the data structure. As yet another example, the rule engine may apply a rule to standardize a date format of the transfer operation data. Certain data sources may provide a portion of the transfer operation data in a month-first format (e.g., MMDDYYYY), while other data sources may provide their portion of the transfer operation data in a year-first format (e.g., YYYYMMDD) or a day-first format (e.g., DDMMYYYY). The rule engine may apply the rule to convert each date in the year-first format or the day-first format to the month-first format.

In some examples, executing the rule engine can cause the rule engine to select one or more rule sets to apply to each postponed transfer operation. For example, the rule engine may select the rule set(s) to apply based on the schema of the data structure. Once the rule set(s) are selected, the rule engine can apply the rule set(s) to encode the transfer operation data in the data structure in compliance with the schema of the data structure.

In some examples, the computing system may generate one or more sections of the data structure on an ongoing basis, such as prior to receiving a complete dataset corresponding to a postponed transfer operation. For example, the computing system may generate a respective section of the data structure corresponding to each sub-operation of the postponed transfer operation once the postponed transfer operation is initiated. One or more sub-operations of the postponed transfer operation may be scheduled for execution after the sections of the data structure are generated. Stated differently, the computing system can include sections in the data structure that can be reserved to input information corresponding to sub-operations that have not occurred yet. In some examples, the computing system can encode a null value in the data structure in association with a sub-operation scheduled to be executed at a future time point, such as to indicate that certain data corresponding to the sub-operation is not available yet. As the computing system receives additional transfer operation data from the data sources, the computing system can continue to update the data structure. For example, the computing system may receive the additional transfer operation data subsequent to the scheduled time point to execute the sub-operation. The computing system may repeat certain operations described herein, such as blocks 202 through 208, as part of updating the data structure. For example, based on the additional transfer operation data, the computing system can determine a status of the sub-operation and encode the status in the data structure by replacing a corresponding null value.

In some examples, once the data structure is generated, the data structure can be used as part of a training process to train a predictive model (e.g., the anomaly prediction model 120 of FIG. 1). Non-limiting examples of the predictive model include a regression model, a neural network, a tree-based model, etc. The predictive model can be executed to determine an anomaly indicator for a target entity from predictor variables associated with the target entity. Additionally, at least a portion of the predictor variables can be determined using the transfer operation data provided in the data structure. The anomaly indicator can indicate a likelihood of an anomaly or an adverse event associated with the target entity. In some implementations, the anomaly indicator can be outputted for use in controlling access of the target entity to one or more interactive computing environments, such as a computing environment hosted by a client computing system 104. In some examples, the anomaly indicator can be a numeric score indicative of a level of risk, such as the likelihood of an anomaly or an adverse event occurring in association with the target entity. In other examples, the anomaly indicator can be a binary indicator of the level of risk associated with the target entity, such as based on a threshold comparison of the level of risk to a predefined threshold corresponding to a maximum acceptable level of risk.

In some implementations, the training process can include one or more operations, such as accessing training vectors that can be used to train the predictive model. The training vectors can include one or more sets of training predictor variables and one or more training outputs corresponding to the respective sets of training predictor variables. The training predictor variables can include features determined from the transfer operation data using the data structure, such as individual measurable properties or characteristics of the transfer operation data. In some implementations, the training vectors can represent the one or more sets of training predictor variables and the one or more training outputs as a respective multi-dimensional vector of numerical values.

The training process additionally can include performing one or more iterative adjustments of parameters of the predictive model based on an optimization function of the predictive model. By way of example, the optimization function can be a loss function that can quantify or otherwise indicate a difference between an output of the predictive model and a ground-truth value or a target output. Performing the training process to adjust the parameters of the predictive model to minimize the loss function can increase an accuracy of the predictive model.

Figure 3:
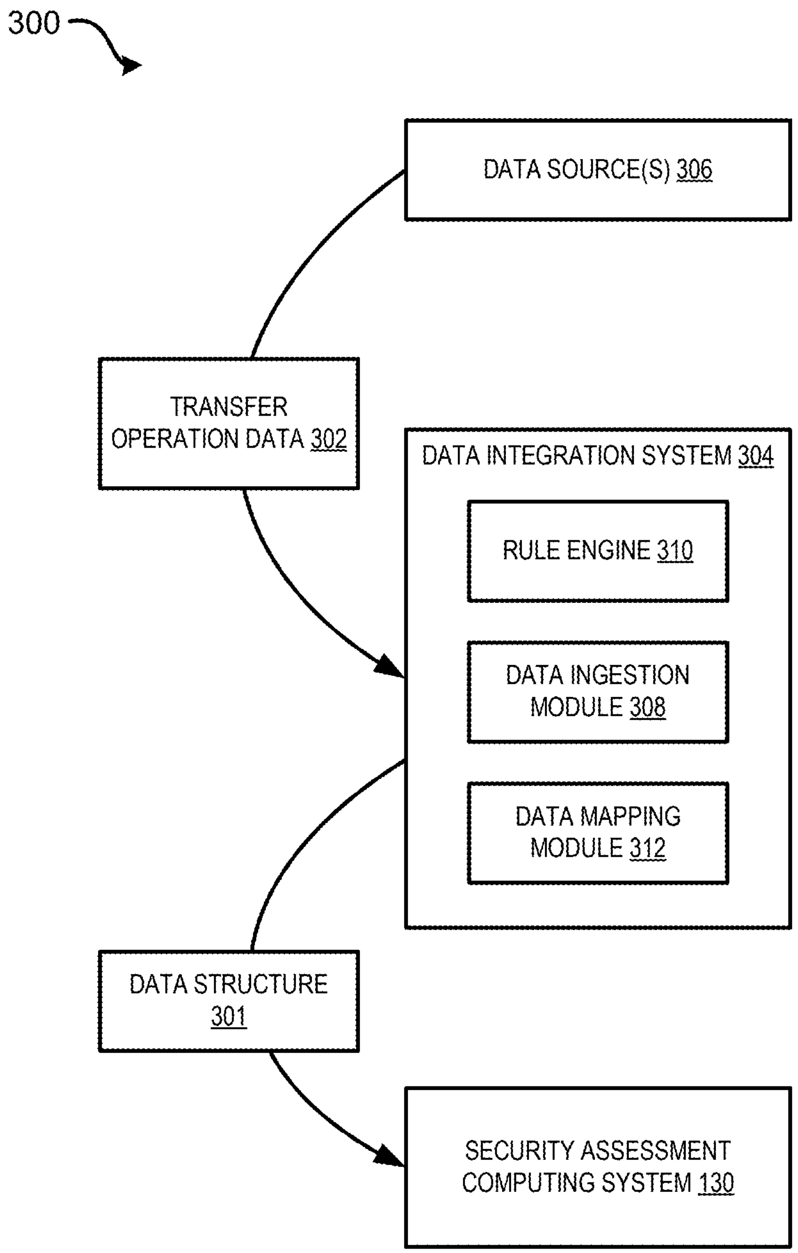
FIG. 3 is a flow diagram depicting an example of a flow of transfer operation data in a computing environment to generate a standardized data structure to integrate postponed transfer operations in security assessment data, according to certain aspects of the present disclosure.

FIG. 3 is a flow diagram depicting an example of a flow of transfer operation data 302 in a computing environment 300 to generate a standardized data structure 301 to integrate postponed transfer operations in security assessment data, according to certain aspects of the present disclosure. Certain aspects of FIG. 3 are described below with reference to one or more components of a preceding figure. In some implementations, the computing environment 300 can include a data integration system 304 and other suitable computing devices or systems, such as the security assessment computing system 130. In the example of FIG. 3, the data integration system 304 is in communication with one or more data sources 306. As described herein, each data source can transmit a respective portion of the transfer operation data 302 to the data integration system 304. In some implementations, the data sources 306 can be heterogeneous or disparate data sources. For example, each data source may transmit its portion of the transfer operation data 302 in a respective data format. As another example, each data source may transmit its portion of the transfer operation data 302 using a respective communication channel, such as a publisher-subscriber communication system, a message queue, an application programming interface, etc. In some examples, certain data sources may be internal to or a part of the data integration system 304. Additionally or alternatively, certain data sources can be external to or separate from the data integration system 304.

In the example of FIG. 3, the data integration system 304 includes a data ingestion module 308. In some implementations, the data ingestion module 308 can receive the transfer operation data 302, such as from the data sources 306. The data ingestion module 308 may transmit the transfer operation data 302 within the data integration system 304 and can perform other suitable tasks related to the transfer operation data 302. For example, the data ingestion module 308 may include a data parser that can parse or otherwise process the transfer operation data 302. In some examples, the data ingestion module 308 can perform one or more operations related to data integration. For example, the data ingestion module 308 may identify individual transfer operations included in the transfer operation data 302, such as based on an operation identifier of a transfer operation, information related to an initiating entity of a transfer operation, etc. As a non-limiting example, an operation identifier can include a sequence of characters that may have a predefined length.

In some examples, the data ingestion module 308 may implement separate process flows based on a respective operation type of the individual transfer operations. A process flow implemented with respect to a postponed transfer operation may differ from another process flow implemented with respect to a transfer operation that is initiated and completed on the same day. In some examples, once the data ingestion module 308 identifies a postponed transfer operation in the transfer operation data 302, the data ingestion module 308 can perform one or more operations described herein. For example, the data ingestion module 308 may perform a segmentation process to segment the postponed transfer operation into a set of sub-operations. The data ingestion module 308 additionally can determine a respective status of each sub-operation, such as by parsing the transfer operation data 302 to determine a respective scheduled time point and a respective execution time point of each sub-operation.

In some examples, once the data ingestion module 308 determines a status corresponding to a sub-operation, the data ingestion module 308 can encode or assign a status indicator in association with the sub-operation. In the example of FIG. 3, the data integration system 304 includes a rule engine 310. The rule engine 310 can apply one or more rule sets to perform certain operations described herein, such as determining or encoding the status indicator corresponding to the sub-operation. For example, the rule engine 310 can apply a rule set to determine a suitable status indicator based on an outcome of the sub-operation. The outcome may correspond to whether an execution of the sub-operation was late or after a scheduled time point of the sub-operation. In some examples, the rule sets of the rule engine 310 can be adjusted or augmented over time. For example, based on historical data or feedback, the data integration system 304 may remove, add, or modify rule sets that the rule engine 310 can apply.

In some implementations, the data ingestion module 308 can assign a null value in place of a status indicator if a sub-operation has not occurred yet, such as if the sub-operation is scheduled to be executed at a future time point. For example, the data ingestion module 308 may determine that an execution time point is absent from the transfer operation data 302. Based on the execution time point being absent from the transfer operation data 302, the data ingestion module 308 can input a null value as a placeholder. In some examples, the data ingestion module 308 can receive additional transfer operation data at a later point in time and can replace the null value with a status indicator determined using the additional transfer operation data.

In the example of FIG. 3, the data integration system 304 includes a data mapping module 312. In some implementations, the data mapping module 312 can determine relationships between individual datasets of the transfer operation data 302 received from the data sources 306 or other data accessible by the data integration system 304. For example, the data mapping module 312 can associate or group different transfer operations that have one or more parameters in common, such as being initiated by the same initiating entity. In some examples, the data mapping module 312 may resolve discrepancies or inconsistencies in the transfer operation data 302 using these relationships. For example, the data mapping module 312 may associate a transfer operation associated with 'John Doe' with another transfer operation associated with 'John H. Doe' based on matching other identifiers in common between these transfer operations, such as a physical address, an email address, a phone number, etc.

In some examples, as depicted in FIG. 3, the data integration system 304 can transmit the data structure 301 in the standardized format to a security assessment computing system 130. In some implementations, the security assessment computing system 130 may be positioned in the same computing environment as the data integration system 304 or may be integrated with the data integration system 304. In other implementations, the security assessment computing system 130 may be positioned in a separate computing environment from the data integration system 304. As described herein, the security assessment computing system 130 can use the data structure 301 as part of a security assessment application, such as outputting an anomaly indicator of a target entity used to grant or deny access by the target entity to a computing environment. In some examples, the security assessment computing system 130 may implement feature engineering techniques to extract one or more features from the transfer operation data 302 provided in the data structure 301. The features can include individual measurable properties or characteristics of the transfer operation data 302. The security assessment computing system 130 can use the features to determine predictor variables to provide as input to a predictive model executable to output the anomaly indicator. Additionally or alternatively, the security assessment computing system 130 can implement the features determined using the data structure 301 in a training process to train the predictive model.

As described herein, the computing system can determine an outcome of a particular sub-operation, such as based on the transfer operation data. For example, the outcome may indicate that an adverse event has occurred in association with the particular sub-operation. As another example, the outcome may indicate that the particular sub-operation has executed on schedule (e.g., on or before the scheduled time point).

Example Data Structures

FIG. 4 is a data structure 400 depicting an example of standardized transfer operation data that can be used to train an anomaly prediction model applicable in a security assessment application, according to certain aspects of the present disclosure. In some examples, the data structure 400 can be provided as an output of the data integration system 304 of FIG. 3. By way of example, the data structure 400 can be outputted in a comma-separated values (CSV) format. Other data formats or structures are possible. In some implementations, the data structure 400 can be used to generate at least a portion of the model training samples 126 of FIG. 1 that can be used to train the anomaly prediction model 120.

In the example of FIG. 4, the data structure 400 presents the standardized transfer operation data in a tabular format including a set of columns and a set of rows. In particular, a first column of the data structure 400 includes one or more data entries corresponding to a first scheduled amount **402*a* of a first sub-operation of each postponed transfer operation. A second column of the data structure 400 includes one or more data entries corresponding to a first amount transferred 404*a* in association with the first sub-operation of each postponed transfer operation. A third column of the data structure 400 includes one or more data entries corresponding to a first scheduled date 406*a* corresponding to the first sub-operation of each postponed transfer operation. A fourth column of the data structure 400 includes one or more data entries corresponding to a first execution date 408*a* corresponding to the first sub-operation of each postponed transfer operation. A fifth column of the data structure 400 includes one or more data entries corresponding to a first status 410*a* of the first sub-operation of each postponed transfer operation. A sixth column of the data structure 400 includes one or more data entries corresponding to a second scheduled amount 402*b* corresponding to a second sub-operation of each postponed transfer operation. A seventh column of the data structure 400 includes one or more data entries corresponding to a second amount transferred 404*b* corresponding to the second sub-operation of each postponed transfer operation. An eighth column of the data structure 400 includes one or more data entries corresponding to a second scheduled date 406*b* corresponding to the second sub-operation of each postponed transfer operation. A ninth column of the data structure 400 includes one or more data entries corresponding to a second execution date 408*b* associated with the second sub-operation of each postponed transfer operation. A tenth column of the data structure 400 includes one or more data entries corresponding to a second status 410*b*** of the second sub-operation of each postponed transfer operation.

In the example of FIG. 4, the data structure 400 can include one or more rows corresponding to a schema of the data structure 400, such as providing metadata or constraints related to data entries in specific columns. In the example of FIG. 4, a first row of the data structure 400 indicates a respective field length of data entries in each column. The field length may range from 1 character to 10 characters. In some implementations, a field length may indicate a maximum number of characters in a particular data entry. As an example, certain data values provided in transfer operation data may be truncated to comply with the field length. As another example, the field length may indicate a specific number of characters to include in a particular data entry. For example, the data structure 400 can include a zero with a single-digit value to comply with a field length of two characters (e.g., '01' or '02').

In the example of FIG. 4, a second row of the data structure 400 indicates a respective character type of data entries in each column. In particular, 'N' corresponds to numeric characters, while 'AN' corresponds to alphanumeric characters. In some examples, certain columns that are assigned a character type of 'N' can be limited to data entries that only include numeric characters, such as 0 through 9. In some examples, certain columns that are assigned a character type of 'AN' can accept data entries that include numbers, letters, or a combination thereof. In some implementations, columns that are assigned a character type of 'N' or 'AN' may not accept other types of characters, such as symbols or whitespaces.

In the example of FIG. 4, a third row of the data structure 400 indicates metadata or one or more rules associated with data entries in each column. For example, the first column of the data structure 400 corresponds to a first scheduled amount **402*a* of a first sub-operation of a postponed transfer operation. The third row in the first column specifies that data entries in the first column are integers (e.g., whole numbers). Certain columns may include a rule set that can include multiple rules constraining data entries in the columns. For example, the fifth column of the data structure 500** includes a rule set of one or more rules constraining the data entries in the fifth column, such as based on a set of predefined status indicators.

In some examples, the data structure 400 can include additional or different data than as depicted in FIG. 4. By way of example, the data structure 400 can include one or more identifiers, such as a column to present a respective unique identifier corresponding to each initiating entity of transfer operations. In some examples, the data structure 400 may include personally identifiable information. As an example, the data structure 400 may include one or more columns to store data entries corresponding to a name of an entity, such as a first name, a middle name, a last name, a surname, a suffix, etc. As another example, the data structure 400 can include a respective column to store data entries corresponding to a birth date, a phone number, an email address, a physical address, etc. of an entity. In some examples, the data structure 400 can include one or more columns to store data entries related to other types of transfer operations. As a non-limiting example, in certain applications, the data structure 400 can include one or more columns to store data corresponding to installment loans or other financing options having a time interval at least on a monthly basis.

Figure 5:
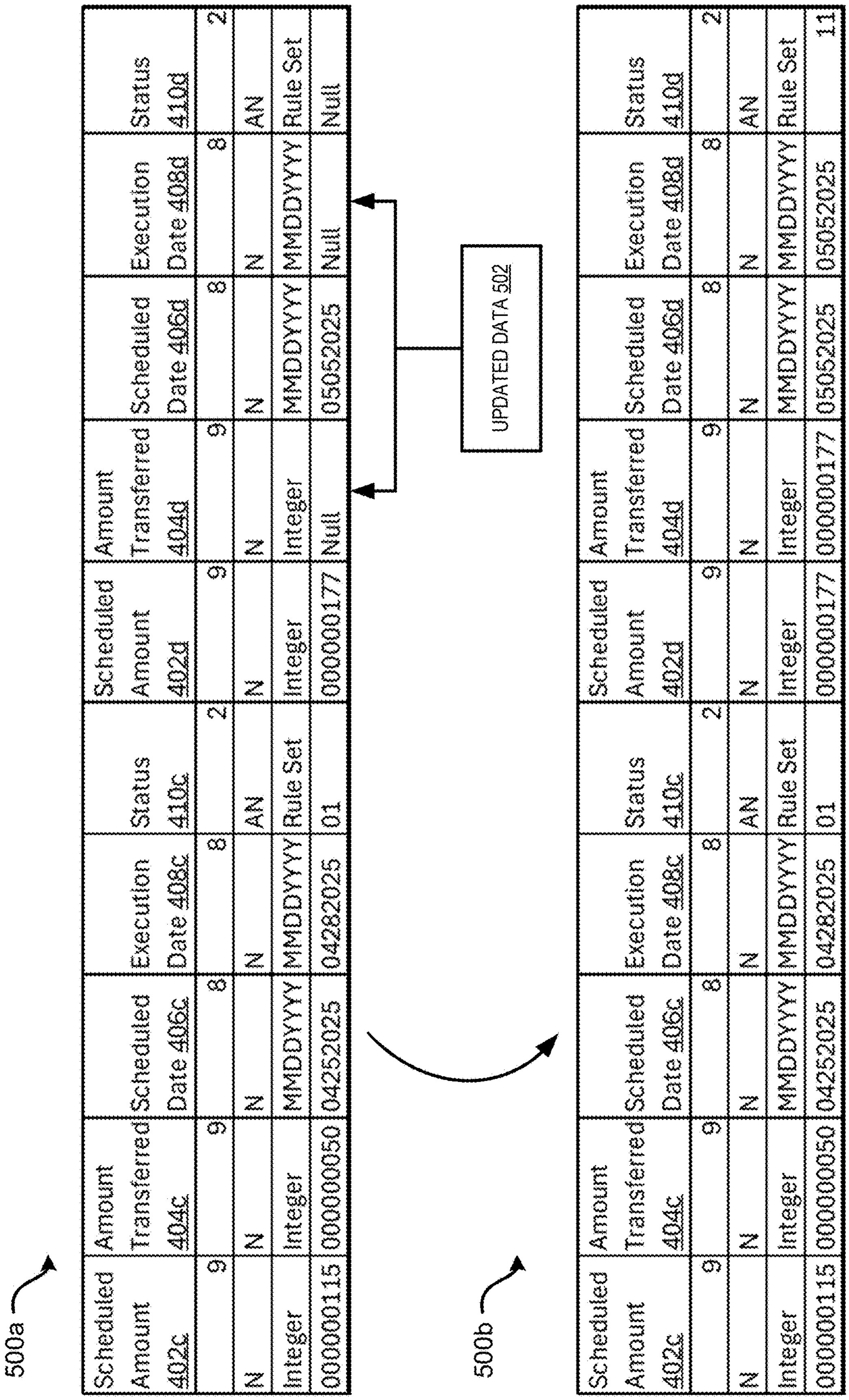
FIG. 5 shows an example data structure of standardized transfer operation data including null values and another example data structure including data entries replacing the null values, according to certain aspects of the present disclosure.

FIG. 5 shows an example first data structure 500*a* of standardized transfer operation data including null values and another example second data structure 500*b* including data entries replacing the null values, according to certain aspects of the present disclosure. The second data structure 500*b* can be an updated version of the first data structure 500*a*. The first data structure 500*a* and/or the second data structure 500*b* can be a continuation of the data structure 400 of FIG. 4. By way of example, the data structure 400 can be outputted in a comma-separated values (CSV) format. Other data formats or structures are possible.

In the example of FIG. 5, the first data structure 500*a* and the second data structure 500*b* include similar columns as described above with respect to the data structure 400 to store data entries corresponding to a third sub-operation and a fourth sub-operation of a postponed transfer operation. In particular, a first column of the data structures 500*a-b* includes one or more data entries corresponding to a third scheduled amount 402*c* corresponding to the third sub-operation of each postponed transfer operation. A second column of the data structures 500*a-b* includes one or more data entries corresponding to a third amount transferred 404*c* corresponding to the third sub-operation of each postponed transfer operation. A third column of the data structures 500*a-b* includes one or more data entries corresponding to a third scheduled date 406*c* corresponding to the third sub-operation of each postponed transfer operation. A fourth column of the data structures 500*a-b* includes one or more data entries corresponding to a third execution date 408*c* corresponding to the third sub-operation of each postponed transfer operation. A fifth column of the data structures 500*a-b* includes one or more data entries corresponding to a third status 410*c* corresponding to the third sub-operation of each postponed transfer operation. A sixth column of the data structures 500*a-b* includes one or more data entries corresponding to a fourth scheduled amount 402*d* corresponding to the fourth sub-operation of each postponed transfer operation. A seventh column of the data structures 500*a-b* includes one or more data entries corresponding to a fourth amount transferred 404*d* corresponding to the fourth sub-operation of each postponed transfer operation. An eighth column of the data structures 500*a-b* includes one or more data entries corresponding to a fourth scheduled date 406*d* corresponding to the fourth sub-operation of each postponed transfer operation. A ninth column of the data structures 500*a-b* includes one or more data entries corresponding to a fourth execution date 408*d* corresponding to the fourth sub-operation of each postponed transfer operation. A tenth column of the data structures 500*a-b* includes one or more data entries corresponding to a fourth status 410*d* corresponding to the fourth sub-operation of each postponed transfer operation.

In the example of FIG. 5, the data structures 500*a-b* indicate that an execution of the third sub-operation was delayed. In particular, the third column of the data structures 500*a-b* indicates that the execution of the third sub-operation was scheduled to occur by Apr. 25, 2025. The fourth column indicates that an actual execution of the third sub-operation occurred on Apr. 28, 2025, which is three days after the scheduled time point. The third status 410*c* can be selected to indicate a specific time window of the delay in executing the third sub-operation. For example, the third status 410*c* of '01' can indicate that the delay ranged from 1 day to 5 days.

In the example of FIG. 5, the first data structure 500*a* includes a set of null values related to the fourth sub-operation. In some implementations, the first data structure 500*a* can include the set of null values due to a lack of data corresponding to the fourth sub-operation, such as with respect to an outcome of the fourth sub-operation. For example, current transfer operation data may lack information related to an actual execution of the fourth sub-operation. Based on updated data 502 received at a later point in time, the first data structure 500*a* can be updated to generate the second data structure 500*b* that can include a respective data entry replacing each null value in the first data structure 500*a*. For example, the updated data 502 can be generated after the fourth sub-operation is executed.

FIG. 6 is a data structure 600 depicting another example of standardized transfer operation data that can be used to train an anomaly prediction model applicable in a security assessment application, according to certain aspects of the present disclosure. In some examples, the data structure 600 can be provided as an output of the data integration system 304 of FIG. 3. By way of example, the data structure 400 can be outputted in a comma-separated values (CSV) format. Other data formats or structures are possible. In some implementations, the data structure 600 can be used to generate at least a portion of the model training samples 126 of FIG. 1 that can be used to train the anomaly prediction model 120.

In the example of FIG. 6, the data structure 600 includes one or more columns that can store data entries related to individual transfer operations. For example, a first column of the data structure 600 includes one or more data entries related to an operation identifier 602 of each transfer operation, such as a postponed transfer operation. The operation identifier 602 can be a unique identifier of the transfer operation. A second column of the data structure 600 includes one or more data entries related to an operation type 604 of each transfer operation. For example, 'P' can indicate that a transfer operation is a postponed transfer operation. A third column of the data structure 600 includes one or more data entries related to an entity identifier 606 corresponding to a respective initiating entity of each transfer operation. A fourth column of the data structure 600 includes one or more data entries related to a frequency 608 of each transfer operation. For example, 'W' can indicate a frequency 608 of a weekly basis, while 'B' can indicate a frequency 608 of a biweekly basis. A fifth column of the data structure 600 includes one or more data entries related to a number of sub-operations 610 of each transfer operation. In some implementations, if an operation type is incompatible with having sub-operations, a null value may be inputted as the number of sub-operations 610. A sixth column of the data structure 600 includes one or more data entries related to an initiation date 612 of each transfer operation. A seventh column of the data structure 600 includes one or more data entries related to a total amount 614 to be transferred in association with each transfer operation. An eighth column of the data structure 600 includes one or more data entries related to a remaining amount 616 of each transfer operation. The remaining amount 616 can be a difference between the total amount 614 and any executed transfers, such as corresponding to one or more executed sub-operations.

Example Computing System

Figure 7:
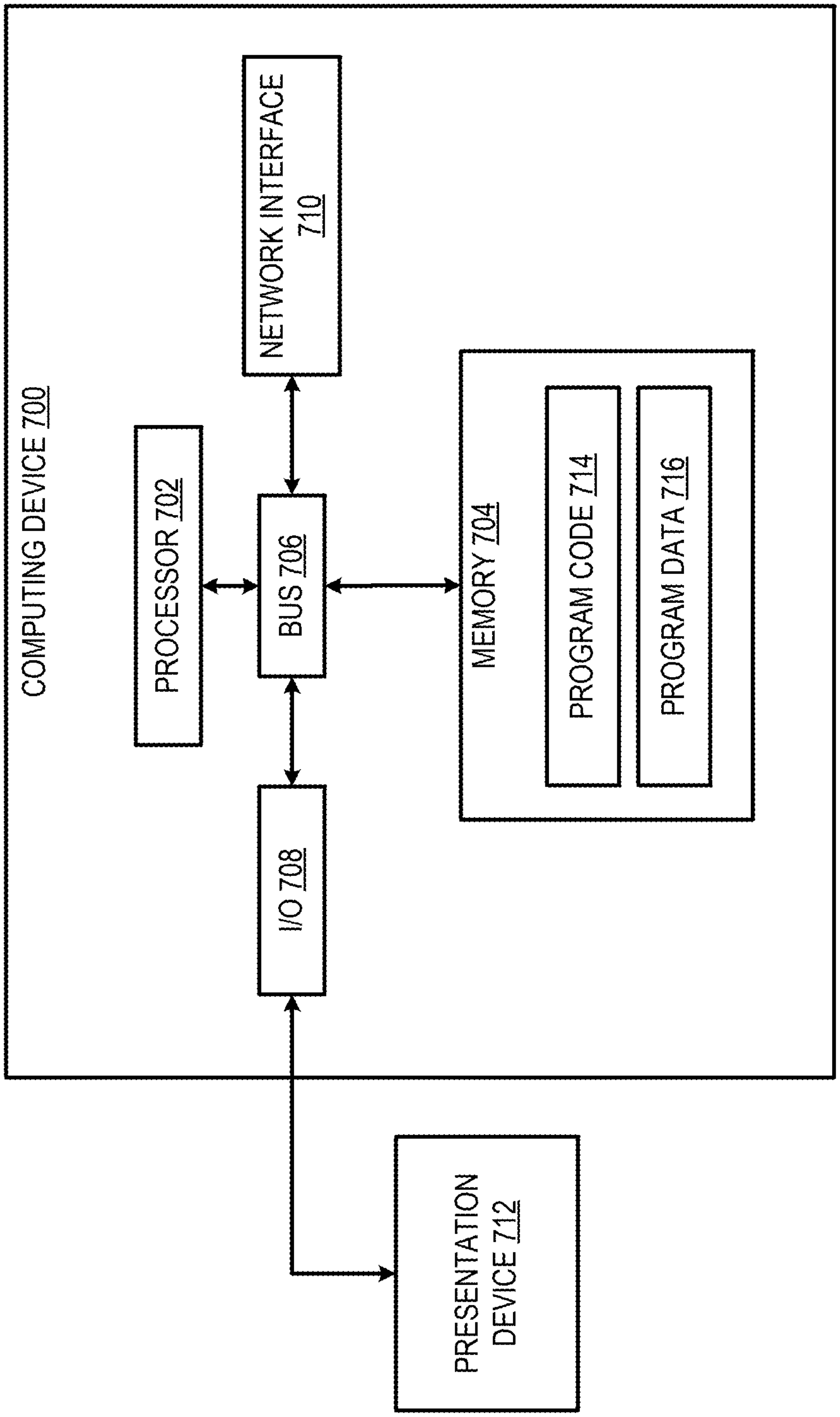
FIG. 7 is a block diagram depicting an example of a computing system suitable for implementing aspects of the techniques and technologies presented herein.

Any suitable computing system or group of computing systems can be used to perform the operations for the machine-learning operations described herein. For example, FIG. 7 is a block diagram depicting an example of a computing device 700. In some implementations, the computing device 700 can be used to implement the security assessment server 118 or the model training server 110 described herein. Additionally or alternatively, the computing device 700 can be used to implement the data integration system described herein. The computing device 700 can include various devices for communicating with other devices in the operating environment 100, as described with respect to FIG. 1. The computing device 700 can include various devices for performing one or more operations described above with respect to one or more previous figures (e.g., any of FIGS. 1-6).

The computing device 700 can include a processor 702 that is communicatively coupled to a memory 704. The processor 702 executes computer-executable program code stored in the memory 704, accesses information stored in the memory 704, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc. may be passed, forwarded, or transmitted via any suitable means including memory sharing, message passing, token passing, network transmission, among others.

Examples of a processor 702 include a microprocessor, an application-specific integrated circuit, a field-programmable gate array, or any other suitable processing device. The processor 702 can include any number of processing devices, including one. The processor 702 can include or communicate with a memory 704. The memory 704 stores program code that, when executed by the processor 702, causes the processor to perform the operations described in this disclosure.

The memory 704 can include any suitable non-transitory computer-readable storage medium. The computer-readable medium can include any electronic, optical, magnetic, or other storage device capable of providing a processor with computer-readable program code or other program code. Non-limiting examples of a computer-readable medium include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language include Hadoop, C, C++, C#, Visual Basic, Java, Python, Perl, JavaScript, ActionScript, etc.

The computing device 700 may also include a number of external or internal devices such as input or output devices. For example, the computing device 700 is shown with an input/output interface 708 that can receive input from input devices or provide output to output devices. A bus 706 can also be included in the computing device 700. The bus 706 can communicatively couple one or more components of the computing device 700.

In some implementations, the computing device 700 can execute program code 714 that includes the security assessment application 114 and/or the model training application 112. Additionally or alternatively, the computing device 700 can execute program code 714 that includes the rule engine 310. The program code 714 for the security assessment application 114 and/or the model training application 112 and/or the rule engine 310 may reside in any suitable computer-readable medium and may be executed on any suitable processing device. For example, as depicted in FIG. 7, the program code 714 for the security assessment application 114 and/or the model training application 112 and the rule engine 310 can reside in the memory 704 at the computing device 700 along with the program data 716 associated with the program code 714, such as the predictor variables 124 and/or the model training samples 126. Executing the security assessment application 114 or the model training application 112 can configure the processor 702 to perform the operations described herein.

In some aspects, the computing device 700 can include one or more output devices. One example of an output device is the network interface device 710 depicted in FIG. 7. A network interface device 710 can include any device or group of devices suitable for establishing a wired or wireless data connection to one or more data networks described herein. Non-limiting examples of the network interface device 710 include an Ethernet network adapter, a modem, etc.

Another example of an output device is the presentation device 712 depicted in FIG. 7. A presentation device 712 can include any device or group of devices suitable for providing visual, auditory, or other suitable sensory output. Non-limiting examples of the presentation device 712 include a touchscreen, a monitor, a speaker, a separate mobile computing device, etc. In some aspects, the presentation device 712 can include a remote client-computing device that communicates with the computing device 700 using one or more data networks described herein. In other aspects, the presentation device 712 can be omitted.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

The invention claimed is:

1. A computer-implemented method, in which one or more processing devices perform operations comprising:

receiving transfer operation data associated with a plurality of postponed transfer operations, each postponed transfer operation of the plurality of postponed transfer operations initiated at a respective initial time point;

performing a conversion process to convert the transfer operation data into a standardized format, the conversion process including operations comprising:

segmenting each postponed transfer operation of the plurality of postponed transfer operations into a respective set of sub-operations, each sub-operation of the respective set of sub-operations allocated a corresponding amount of protected resources, wherein at least one sub-operation of the respective set of sub-operations is scheduled at a time point subsequent to the respective initial time point;

determining, based on the transfer operation data, a respective status of each sub-operation of the respective set of sub-operations; and encoding the respective status in association with each sub-operation of the respective set of sub-operations; and generating a data structure comprising the transfer operation data in the standardized format, the data structure presenting the respective set of sub-operations in an ordered arrangement based on a respective scheduled time point of each sub-operation of the respective set of sub-operations.

2. The computer-implemented method of claim 1, further comprising:

determining, using a predictive model trained using a training process, an anomaly indicator for a target entity from predictor variables associated with the target entity, wherein the anomaly indicator indicates a likelihood of an adverse event occurring in association with the target entity, wherein the training process includes operations comprising:

accessing training vectors having a plurality of sets of training predictor variables and a plurality of training outputs corresponding to a respective set of training predictor variables, wherein at least a portion of the training vectors are generated using the transfer operation data in the data structure; and performing iterative adjustments of parameters of the predictive model based on an optimization function of the predictive model; and outputting the anomaly indicator for use in controlling access of the target entity to one or more interactive computing environments.

3. The computer-implemented method of claim 1, wherein the standardized format is a structured data format defined by a schema, and wherein the schema comprises a respective data type and a respective set of rules corresponding to each data entry of the data structure.

4. The computer-implemented method of claim 1, wherein encoding the respective status in association with each sub-operation of the respective set of sub-operations further comprises, for a particular sub-operation of the respective set of sub-operations:

determining, based on the transfer operation data, an outcome of the particular sub-operation;

selecting, from a set of predefined status indicators, a status indicator corresponding to the outcome; and storing the status indicator in association with the particular sub-operation.

5. The computer-implemented method of claim 1, wherein generating the data structure comprising the transfer operation data in the standardized format further comprises:

executing a rule engine configured to:

select, for each postponed transfer operation of the plurality of postponed transfer operations, one or more rule sets based on a schema of the data structure; and apply the one or more rule sets to encode the transfer operation data in the data structure in compliance with the schema.

6. The computer-implemented method of claim 1, further comprising:

encoding a null value in the data structure in association with a particular sub-operation of the respective set of sub-operations, wherein the particular sub-operation is scheduled to be executed at a future time point;

receiving additional transfer operation data generated subsequent to the future time point;

determining, based on the additional transfer operation data, a status of the particular sub-operation; and updating the data structure by encoding the status in association with the particular sub-operation, wherein the status replaces the null value in the data structure.

7. The computer-implemented method of claim 1, wherein a time window between a scheduled execution of each sub-operation of the respective set of sub-operations is less than thirty days.

8. A system comprising:

a processor; and a memory in which instructions executable by the processor are stored to cause the processor to perform operations comprising:

receiving transfer operation data associated with a plurality of postponed transfer operations, each postponed transfer operation of the plurality of postponed transfer operations initiated at a respective initial time point;

performing a conversion process to convert the transfer operation data into a standardized format, the conversion process including operations comprising:

segmenting each postponed transfer operation of the plurality of postponed transfer operations into a respective set of sub-operations, each sub-operation of the respective set of sub-operations allocated a corresponding amount of protected resources, wherein at least one sub-operation of the respective set of sub-operations is scheduled at a time point subsequent to the respective initial time point;

determining, based on the transfer operation data, a respective status of each sub-operation of the respective set of sub-operations; and encoding the respective status in association with each sub-operation of the respective set of sub-operations; and generating a data structure comprising the transfer operation data in the standardized format, the data structure presenting the respective set of sub-operations in an ordered arrangement based on a respective scheduled time point of each sub-operation of the respective set of sub-operations.

9. The system of claim 8, wherein the operations further comprise:

determining, using a predictive model trained using a training process, an anomaly indicator for a target entity from predictor variables associated with the target entity, wherein the anomaly indicator indicates a likelihood of an adverse event occurring in association with the target entity, wherein the training process includes operations comprising:

accessing training vectors having a plurality of sets of training predictor variables and a plurality of training outputs corresponding to a respective set of training predictor variables, wherein at least a portion of the training vectors are generated using the transfer operation data in the data structure; and performing iterative adjustments of parameters of the predictive model based on an optimization function of the predictive model; and outputting the anomaly indicator for use in controlling access of the target entity to one or more interactive computing environments.

10. The system of claim 8, wherein the standardized format is a structured data format defined by a schema, and wherein the schema comprises a respective data type and a respective set of rules corresponding to each data entry of the data structure.

11. The system of claim 8, wherein encoding the respective status in association with each sub-operation of the respective set of sub-operations further comprises, for a particular sub-operation of the respective set of sub-operations:

determining, based on the transfer operation data, an outcome of the particular sub-operation;

selecting, from a set of predefined status indicators, a status indicator corresponding to the outcome; and storing the status indicator in association with the particular sub-operation.

12. The system of claim 8, wherein generating the data structure comprising the transfer operation data in the standardized format further comprises:

executing a rule engine configured to:

select, for each postponed transfer operation of the plurality of postponed transfer operations, one or more rule sets based on a schema of the data structure; and apply the one or more rule sets to encode the transfer operation data in the data structure in compliance with the schema.

13. The system of claim 8, wherein the operations further comprise:

encoding a null value in the data structure in association with a particular sub-operation of the respective set of sub-operations, wherein the particular sub-operation is scheduled to be executed at a future time point;

receiving additional transfer operation data generated subsequent to the future time point;

determining, based on the additional transfer operation data, a status of the particular sub-operation; and updating the data structure by encoding the status in association with the particular sub-operation, wherein the status replaces the null value in the data structure.

14. The system of claim 8, wherein a time window between a scheduled execution of each sub-operation of the respective set of sub-operations is less than thirty days.

15. A non-transitory computer-readable storage medium having program code that is executable by a processing device for causing the processing device to perform operations, the operations comprising:

receiving transfer operation data associated with a plurality of postponed transfer operations, each postponed transfer operation of the plurality of postponed transfer operations initiated at a respective initial time point;

performing a conversion process to convert the transfer operation data into a standardized format, the conversion process including operations comprising:

segmenting each postponed transfer operation of the plurality of postponed transfer operations into a respective set of sub-operations, each sub-operation of the respective set of sub-operations allocated a corresponding amount of protected resources, wherein at least one sub-operation of the respective set of sub-operations is scheduled at a time point subsequent to the respective initial time point;

determining, based on the transfer operation data, a respective status of each sub-operation of the respective set of sub-operations; and encoding the respective status in association with each sub-operation of the respective set of sub-operations; and generating a data structure comprising the transfer operation data in the standardized format, the data structure presenting the respective set of sub-operations in an ordered arrangement based on a respective scheduled time point of each sub-operation of the respective set of sub-operations.

16. The non-transitory computer-readable storage medium of claim 15, wherein the operations further comprise:

determining, using a predictive model trained using a training process, an anomaly indicator for a target entity from predictor variables associated with the target entity, wherein the anomaly indicator indicates a likelihood of an adverse event occurring in association with the target entity, wherein the training process includes operations comprising:

accessing training vectors having a plurality of sets of training predictor variables and a plurality of training outputs corresponding to a respective set of training predictor variables, wherein at least a portion of the training vectors are generated using the transfer operation data in the data structure; and performing iterative adjustments of parameters of the predictive model based on an optimization function of the predictive model; and outputting the anomaly indicator for use in controlling access of the target entity to one or more interactive computing environments.

17. The non-transitory computer-readable storage medium of claim 15, wherein the standardized format is a structured data format defined by a schema, and wherein the schema comprises a respective data type and a respective set of rules corresponding to each data entry of the data structure.

18. The non-transitory computer-readable storage medium of claim 15, wherein encoding the respective status in association with each sub-operation of the respective set of sub-operations further comprises, for a particular sub-operation of the respective set of sub-operations:

determining, based on the transfer operation data, an outcome of the particular sub-operation;

selecting, from a set of predefined status indicators, a status indicator corresponding to the outcome; and storing the status indicator in association with the particular sub-operation.

19. The non-transitory computer-readable storage medium of claim 15, wherein generating the data structure comprising the transfer operation data in the standardized format further comprises:

executing a rule engine configured to:

select, for each postponed transfer operation of the plurality of postponed transfer operations, one or more rule sets based on a schema of the data structure; and apply the one or more rule sets to encode the transfer operation data in the data structure in compliance with the schema.

20. The non-transitory computer-readable storage medium of claim 15, wherein the operations further comprise:

encoding a null value in the data structure in association with a particular sub-operation of the respective set of sub-operations, wherein the particular sub-operation is scheduled to be executed at a future time point;

receiving additional transfer operation data generated subsequent to the future time point;

determining, based on the additional transfer operation data, a status of the particular sub-operation; and updating the data structure by encoding the status in association with the particular sub-operation, wherein the status replaces the null value in the data structure.

* * * * *